(No Model.)
E. E. GOLD.
SEAT FOR HOSE COUPLINGS.
No. 550,267. Patented Nov. 26, 1895.
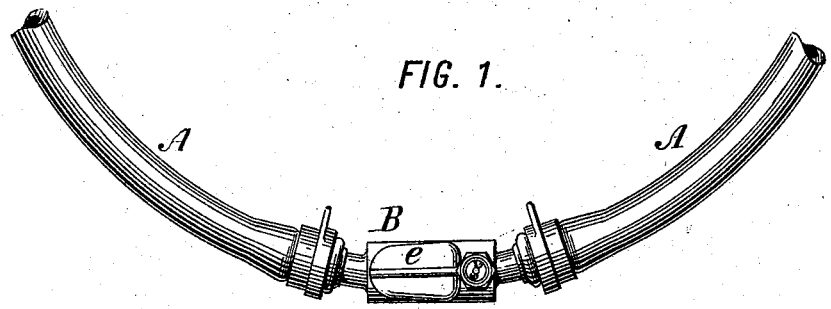
FIG. 1.
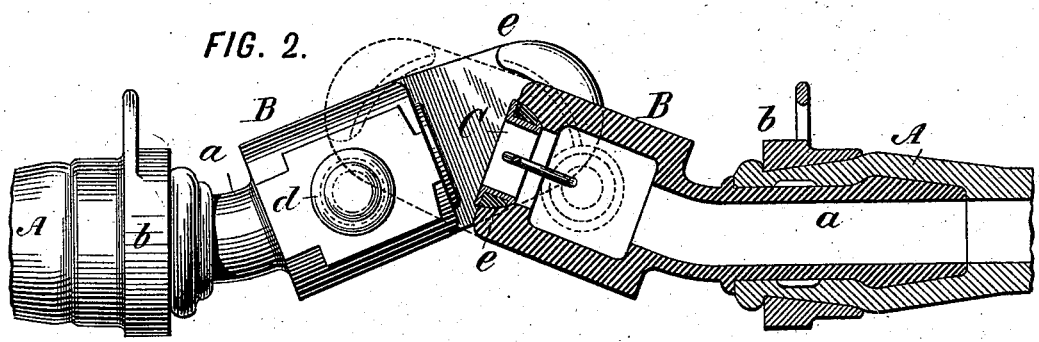
FIG. 2.
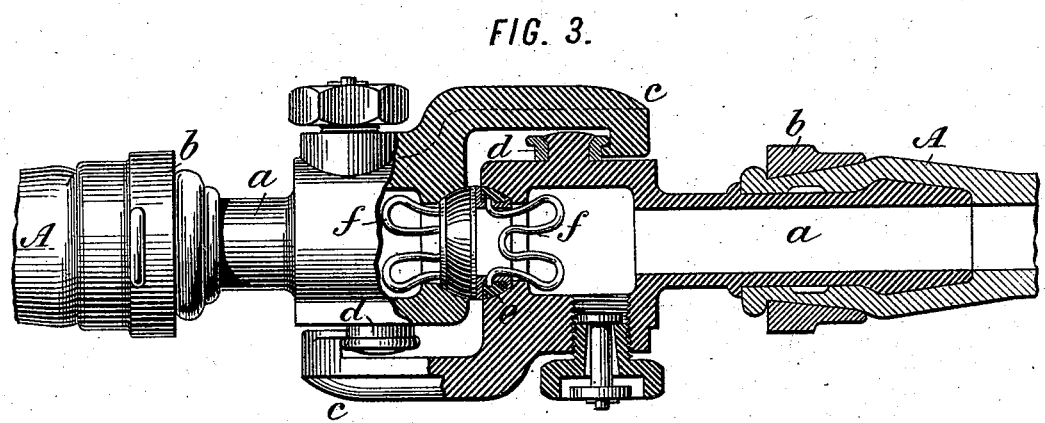
FIG. 3.
FIG. 4.   FIG. 5.
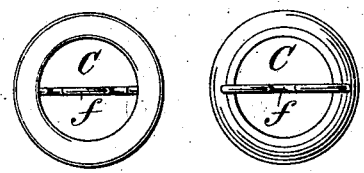
WITNESSES:
Fred White
Thomas F. Wallace
INVENTOR:
Edward E. Gold,
By his Attorneys.
Arthur C. Fraser & Co.

United States Patent Office.

EDWARD E. GOLD, OF NEW YORK, N. Y.

SEAT FOR HOSE-COUPLINGS.

SPECIFICATION forming part of Letters Patent No. 550,267, dated November 26, 1895.

Application filed March 27, 1895. Serial No. 543,310. (No model.)

*To all whom it may concern:*

Be it known that I, EDWARD E. GOLD, a citizen of the United States, residing in the city, county, and State of New York, have invented certain new and useful Improvements in Seats for Hose-Couplings, of which the following is a specification.

The present invention introduces an improvement in hose-couplings having compensating seats or gaskets such as those shown in patent to Balmore and Gold, No. 475,738, dated May 24, 1892. In the couplings shown in that patent the coupling-heads are formed with spherical recesses, in which are seated compensating seats or gaskets formed as rings, each with a flat outer face where it seats against the opposite or companion gasket, and with a curved rear face formed in the segment of a sphere, which fits in and rocks against said recess. Heretofore these gaskets have been made of a yielding packing composition, strengthened by an internal sleeve to prevent the pressure from contracting and reducing the opening through the gasket. Consequently the soft composition has been presented not only where the gasket bears against the spherical recess, but also on the outer face where it bears against the companion gasket. After an extended practical experience, it has been found that the best and most durable composition existing for this purpose is liable to be chipped or broken in the act of coupling or uncoupling, and to be scratched or creased by grit getting between the two flat faces, thereby causing leakage.

My present invention, which is the outcome of long experiments and efforts to overcome these difficulties, consists in constructing the gasket with a metal shell comprising a flat face extending on the outer or front side of the gasket and a sleeve extending within the gasket and a filling or packing of yielding composition applied to said metal shell and appearing on the spherical rear face of the gasket. By means of this construction the advantage of the yielding composition for making a tight joint between the gasket and recess is secured, while at the same time the composition is entirely protected, does not ordinarily appear at all on the exterior, and hence cannot be struck or chipped, and the flat front face of the metal shell by being ground to a perfect plane, makes a steam-tight fit with the similarly-ground face of the opposite or companion coupler, being hard enough to resist breakage and to be unaffected by any ordinary dirt or grit that may get between the faces.

Figure 1 of the accompanying drawings shows a pair of hose-lengths connected by the Gold straight-port couplers. Fig. 2 is an elevation, partly in mid-section, on a larger scale, showing the couplers in the act of coupling or uncoupling. Fig. 3 is a plan, partly in horizontal section, showing the couplers in the coupled position. Figs. 4 and 5 show the front and rear faces of the seat or gasket removed.

The drawings show my improvement as applied to the Gold straight-port coupler.

Referring to the drawings, let A A designate the lengths of hose, and B B the couplers or coupling-heads, which are united to the hose by means of a neck or nipple $a$, formed on each head, entering the hose, being compressed thereon by a collar $b$. Each coupling-head is formed with a locking-arm $c$, extending forwardly upon one side, and a lug $d$ upon its other side, the arm $c$ of one coupling-head engaging the lug $d$ on the other, and being formed with a cam-face or locking-flange so shaped that in turning the coupling-heads into line this cam-face draws the two heads together to make a tight joint. Each coupling-head is formed with a central opening through it approximately in line, as shown in Fig. 3, with the passage through the necks $a$ $a$, and this opening is enlarged to form a spherical recess $e$. A compensating or tilting seat or gasket C is constructed to fit into and rock or oscillate in this recess, being held in place preferably by a reverse-curved spring $f$, passing through the opening and engaging the inner margin thereof, as shown in Fig. 3. The rear face of the seat or gasket C is made in the segment of a sphere accurately fitting the spherical recess $e$, while its front or outer face is made flat, so as to fit against the flat face of the opposite or companion gasket.

According to my present invention I construct the gasket C of two parts, a metal shell $g$ and a composition packing or filling $h$. (Shown separate in Fig. 6.) The shell $g$ is formed with an inner sleeve $i$, an outer or front flange or face $j$, and an inner or rear flange $k$, as shown in Fig. 7. The metal shell is first constructed and the composition $h$ is then molded in it. The material for the shell may be of any metal of suitable strength and hardness and non-corrosive quality, but hard brass or bronze is preferable. Its front face $j$ is ground to a perfect plane and made very smooth or polished. The portions of the metal shell coinciding with the spherical rear surface are ground to an exact level with the molded composition.

My invention is not limited to straight-port couplers, but is equally applicable to side-port couplers, in the manner shown in Fig. 10 of said Patent No. 475,738.

I claim as my invention the following defined novel features, substantially as hereinbefore specified, namely:

1. In a hose coupler having locking devices, and a spherical recess receiving an annular seat or gasket having universal motion, the said gasket constructed with a metal shell on its front side, ground to a flat face, and extending as a sleeve within it, and a yielding composition on its rear spherical side, whereby the gasket presents a hard metal face to the corresponding face on the companion coupler, and a yielding surface where it fits into said spherical recess.

2. A compensating seat or gasket for a hose coupler, consisting of a metal shell $g$ comprising a flat front face $j$ and a tubular sleeve $i$, and a yielding composition $h$ appearing on the spherical rear face of the gasket.

3. A compensating seat or gasket for a hose coupler, consisting of a metal shell $g$ comprising a flat front face $j$ a tubular sleeve $i$ and an inner flange $k$, and a yielding composition appearing on the spherical rear face of the gasket.

In witness whereof I have hereunto signed my name in the presence of two subscribing witnesses.

EDWARD E. GOLD.

Witnesses:
GEORGE H. FRASER,
ARTHUR C. FRASER.